United States Patent
Wen et al.

(10) Patent No.: US 12,505,783 B2
(45) Date of Patent: Dec. 23, 2025

(54) INFORMATION COLLECTION MODULE AND APPARATUS WITH INDUCTION COIL AND A RECTIFYING CIRCUITRY

(71) Applicant: BOE TECHNOLOGY GROUP CO., LTD., Beijing (CN)

(72) Inventors: Mengyang Wen, Beijing (CN); Libin Liu, Beijing (CN); Shiming Shi, Beijing (CN); Dawei Wang, Beijing (CN); Haijun Qiu, Beijing (CN)

(73) Assignee: Beijing BOE Technology Development Co., Ltd., Beijing (CN)

( * ) Notice: Subject to any disclaimer, the term of this patent is extended or adjusted under 35 U.S.C. 154(b) by 0 days.

(21) Appl. No.: 18/840,550

(22) PCT Filed: Sep. 28, 2023

(86) PCT No.: PCT/CN2023/122520
§ 371 (c)(1),
(2) Date: Aug. 22, 2024

(87) PCT Pub. No.: WO2024/093599
PCT Pub. Date: May 10, 2024

(65) Prior Publication Data
US 2025/0182675 A1  Jun. 5, 2025

(30) Foreign Application Priority Data
Oct. 31, 2022  (CN) .......................... 202211352272.9

(51) Int. Cl.
G09G 3/30  (2006.01)

(52) U.S. Cl.
CPC ....... *G09G 3/30* (2013.01); *G09G 2300/0426* (2013.01); *G09G 2320/0233* (2013.01); *G09G 2330/021* (2013.01); *G09G 2358/00* (2013.01); *G09G 2370/042* (2013.01)

(58) Field of Classification Search
CPC ....................................................... G09G 3/30
See application file for complete search history.

(56) References Cited

U.S. PATENT DOCUMENTS

2002/0132383 A1*  9/2002  Hiroki ................ G01R 31/2607
                                                       257/E27.113

FOREIGN PATENT DOCUMENTS

| CN | 1630083 A | 6/2005 |
| CN | 2884658 Y | 3/2007 |
| CN | 101739584 A | 6/2010 |

(Continued)

OTHER PUBLICATIONS

CN2884658Y machine translation (Year: 2025).*

(Continued)

*Primary Examiner* — Gustavo Polo
(74) *Attorney, Agent, or Firm* — WHDA, LLP

(57) ABSTRACT

The present disclosure provides an information collection module and an information collection apparatus. The information collection module includes: a substrate including a display region, a light-emitting unit being distributed in the display region; and an induction coil and a rectifying circuitry arranged on the substrate, the induction coil being electrically coupled to electrodes of the light-emitting unit via the rectifying circuitry, the rectifying circuitry being configured to rectify a current.

18 Claims, 5 Drawing Sheets

(56) References Cited

FOREIGN PATENT DOCUMENTS

| | | |
|---|---|---|
| CN | 101763783 A | 6/2010 |
| CN | 102637917 A | 8/2012 |
| CN | 102984853 A | 3/2013 |
| CN | 110176203 A | 8/2019 |
| CN | 210691928 U | 6/2020 |
| CN | 210836954 U | 6/2020 |
| CN | 113327947 A | 8/2021 |
| CN | 113658534 A | 11/2021 |
| CN | 115662295 A | 1/2023 |
| JP | 2012-129127 A | 7/2012 |
| WO | 2020/191870 A1 | 10/2020 |

OTHER PUBLICATIONS

Office Action dated Feb. 6, 2025, issued in counterpart CN Application No. 202211352272.9, with English translation. (11 pages).

\* cited by examiner

INFORMATION COLLECTION MODULE AND APPARATUS WITH INDUCTION COIL AND A RECTIFYING CIRCUITRY

CROSS-REFERENCE TO RELATED APPLICATION

The present disclosure is the U.S. national phase of PCT Application No. PCT/CN2023/122520 filed on Sep. 28, 2023, which claims a priority of the Chinese patent application No. 202211352272.9 filed on Oct. 31, 2022, which is incorporated herein by reference in its entirety.

TECHNICAL FIELD

The present disclosure relates to the field of display technology, in particular to an information collection module and an information collection apparatus.

BACKGROUND

Along with the development of electronic products, in order to satisfy various demands, portable terminals with wireless charging and wireless reverse charging functions have been developed rapidly. In addition, the distribution of wireless chargers has been expanded, and more and more wireless electronic devices occur in our daily life.

Due to the development of the wireless charging technology and products, it is able to supply power to relevant devices through the wireless reverse charging function of a mobile phone. Many devices or products have identification information, and a type of the device or product may be determined in accordance with the identification information. However, the existing identification information is mainly provided through labels, and the labels are easily counterfeited, or easily contaminated or damaged by an external environment, which causes inconvenience to users.

SUMMARY

An object of the present disclosure is to provide an information collection module and an information collection apparatus.

In a first aspect, the present disclosure provides in some embodiments an information collection module, including: a substrate including a display region, a light-emitting unit being distributed in the display region; and an induction coil and a rectifying circuitry arranged on the substrate, the induction coil being electrically coupled to electrodes of the light-emitting unit via the rectifying circuitry.

In a possible embodiment of the present disclosure, the rectifying circuitry includes a rectifier bridge, one end of the induction coil is electrically coupled to a first end of the rectifier bridge, the other end of the induction coil is electrically coupled to a second end of the rectifier bridge, a first electrode of the light-emitting unit is electrically coupled to a third end of the rectifier bridge, and a second electrode of the light-emitting unit is electrically coupled to a fourth end of the rectifier bridge; or the rectifying circuitry includes a rectifier diode through which the induction coil is electrically coupled to the electrodes of the light-emitting unit.

In a possible embodiment of the present disclosure, the rectifying circuitry includes a thin film transistor. The thin film transistor includes: an active layer, and a first electrode and a second electrode coupled to the active layer, one end of the induction coil being electrically coupled to the first electrode, the second electrode being electrically coupled to a first electrode of the light-emitting unit, and the other end of the induction coil being electrically coupled to a second electrode of the light-emitting unit; and a control electrode electrically coupled to any one of the first electrode and the second electrode.

In a possible embodiment of the present disclosure, at least one induction coil is coupled to a plurality of thin film transistors, the first electrode of each of the thin film transistors is electrically coupled to an end of the induction coil, and the second electrode of each of the thin film transistors is electrically coupled to the first electrode or the second electrode of at least one corresponding light-emitting unit.

In a possible embodiment of the present disclosure, the first electrode, the second electrode and the induction coil are arranged on a same layer.

In a possible embodiment of the present disclosure, the quantity of induction coils is plural, and at least one induction coil is coupled to a plurality of light-emitting units.

In a possible embodiment of the present disclosure, the quantity of induction coils is plural, and the light-emitting units coupled to at least two induction coils have different light-emitting frequencies.

In a possible embodiment of the present disclosure, the quantity of induction coils is plural, each of the induction coils is coupled to at least one light-emitting unit, and at least two induction coils are different from each other.

In a possible embodiment of the present disclosure, the quantity of induction coils is plural, and the quantity of the light-emitting units coupled to at least two induction coils is different.

In a possible embodiment of the present disclosure, at least one induction coil is coupled to a plurality of light-emitting units, and the electrodes of at least two light-emitting units are coupled to the induction coil at different positions.

In a possible embodiment of the present disclosure, the quantity of induction coils is plural, and the quantity of induction coils coupled to at least two light-emitting units is different.

In a possible embodiment of the present disclosure, the quantity of induction coils is plural, and the plurality of induction coils is arranged on a same layer.

In a possible embodiment of the present disclosure, one end of the induction coil and a first electrode of the light-emitting unit are electrically coupled to one end of a voltage stabilizing capacitor, and the other end of the induction coil and a second electrode of the light-emitting unit are electrically coupled to the other end of the voltage stabilizing capacitor.

In a second aspect, the present disclosure provides in some embodiments an information collection apparatus including the above-mentioned information collection module.

In a possible embodiment of the present disclosure, the information collection apparatus includes at least one of document, label, card, stamp, package or bottle.

Figure 1A:
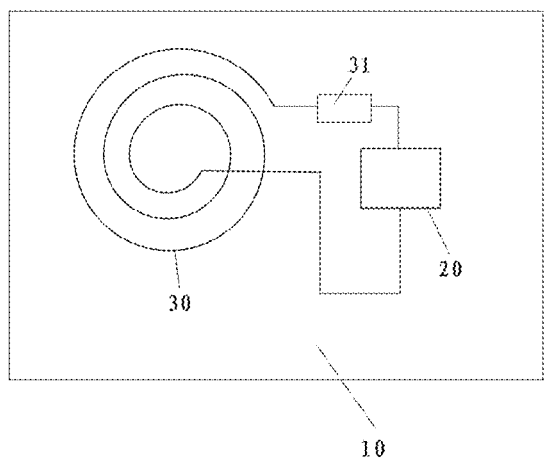
FIG. 1a is a schematic view showing an information collection module according to one embodiment of the present disclosure.

REFERENCE SIGN LIST 10 substrate
11 buffer layer
12 insulation layer
13 dielectric layer
14 passivation layer
15 planarization layer
16 cover layer
17 deposition layer
18 ink layer
19 deposition layer
20 light-emitting unit
21 first electrode
22 second electrode
23 light-emitting layer
30 induction coil
31 rectifying circuitry
40 thin film transistor
41 active layer
42 first electrode
43 second electrode
44 control electrode
50 rectifier bridge
60 voltage stabilizing capacitor
70 electromagnetic coil
80 rectifier diode

DETAILED DESCRIPTION

In order to make the objects, the technical solutions and the advantages of the present disclosure more apparent, the present disclosure will be described hereinafter in a clear and complete manner in conjunction with the drawings and embodiments. Obviously, the following embodiments merely relate to a part of, rather than all of, the embodiments of the present disclosure, and based on these embodiments, a person skilled in the art may, without any creative effort, obtain the other embodiments, which also fall within the scope of the present disclosure.

Such words as "first" and "second" involved in the specification and the appended claims are merely used to differentiate different objects rather than to represent any specific order. It should be appreciated that, the data used in this way may be replaced with each other, so as to implement the embodiments in an order other than that shown in the drawings or described in the specification. The expression "and/or" involved in the embodiments of the present disclosure may represent at least one of listed items. The symbol "/" usually refers to "or".

An information collection module in the embodiments of the present disclosure will be described hereinafter in details in conjunction with FIG. 1a to FIG. 11d, the embodiments and application scenarios.

As shown in FIG. 1a to FIG. 6 and FIG. 8a to FIG. 10, the information collection module includes: a substrate 10 including a display region, a light-emitting unit 20 being distributed in the display region; and an induction coil 30 and a rectifying circuitry 31 arranged on the substrate 10. The induction coil 30 is electrically coupled to electrodes of the light-emitting unit 20 via the rectifying circuitry 30 for rectifying a current.

The light-emitting units 20 are distributed at intervals in the display region, e.g., in an array form, or in any other patterns. The display region is located in a peripheral region, a corner region or a middle region of the substrate 10. The display region is arranged at one or more sides or one or more corners of the substrate 10. A specific position and a specific shape of the display region may be selected according to the practical need. Through the light-emitting units 20, different display information is provided in the display region, so a user may obtain, identify or confirm information in accordance with the display information. In the case that the quantity of light-emitting units 20 is plural, the plurality of light-emitting units 20 may be distributed in the form of a strip, a folded line, a curve, a ring, a circle, an oval, or a polygon. Also, the plurality of light-emitting units 20 may be distributed in the form of a pattern, a word, a character, or any other symbol. In this way, different display information is provided when light is emitted by the light-emitting units 20, thereby the user may obtain and identify various information.

One or more display regions may be provided. In the case that there is a plurality of display regions, the plurality of display regions is distributed at intervals, e.g., in an array form, or in the form of a strip, a folded line, a curve, a ring, a circle, an oval or a polygon, or in the form of a pattern, a word, a character or any other symbols. In this way, different display information is provided when light is emitted by the light-emitting units 20, thereby the user may obtain and identify information.

Figure 2:
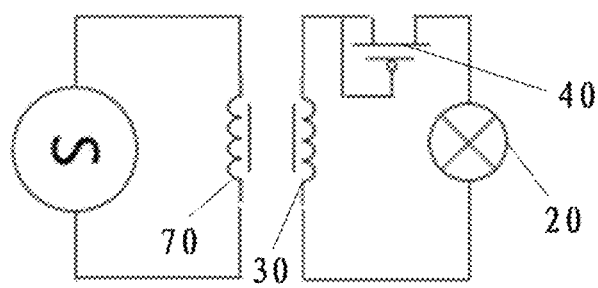
FIG. 2 is a schematic view showing a situation where induction occurs between an external device and an induction coil.
Figure 3:
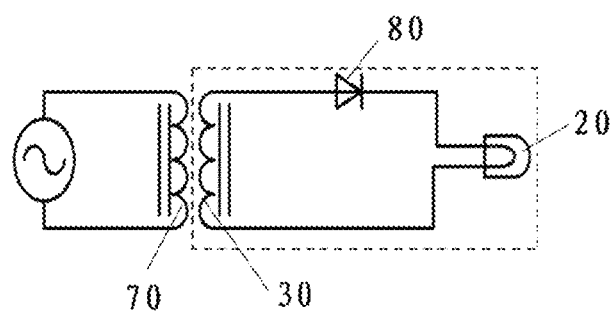
FIG. 3 is another schematic view showing the situation where induction occurs between the external device and the induction coil.
Figure 4:
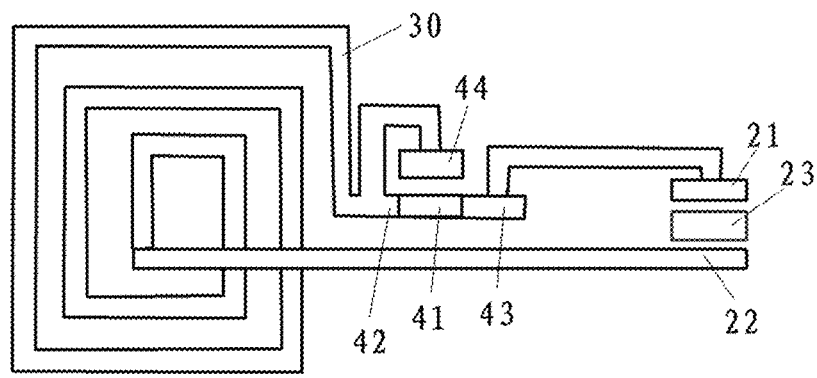
FIG. 4 is a schematic view showing a situation where the induction coil is coupled to a light-emitting unit according to one embodiment of the present disclosure.

The induction coils 30 is arranged on the substrate 10, one end of the induction coil 30 is electrically coupled to a first electrode 21 of the light-emitting unit 20 via the rectifying circuitry 30, and the other end of the induction coil 30 is electrically coupled to a second electrode 22 of the light-emitting unit 20. The light-emitting unit 20 is driven to emit light under the effect of an induction current generated by the induction coil 30, and the induction current is rectified by the rectifying circuitry 30. Alternatively, one end of the induction coil 30 is electrically coupled to the first electrode 21 of the light-emitting unit 20, and the other end of the induction coil 30 is electrically coupled to the second electrode 22 of the light-emitting unit 20 via the rectifying circuitry 30. The light-emitting unit 20 is driven to emit light under the effect of the induction current generated by the induction coil 30, and the induction current is rectified by the rectifying circuitry 30 to improve a display effect. As shown in FIG. 2 and FIG. 3, a current is generated by the induction coil through near field induction of an electronic device, i.e., an electromagnetic field is generated by an electromagnetic coil 70 of the electronic device, and the current is generated by the induction coil 30 in the electromagnetic field. A near field electromagnetic frequency of the electronic device is 10 MHz to 20 MHz, e.g., 13.56 MHz, and the light-emitting unit is driven to emit light under the effect of the current generated by the induction coil.

One or more light-emitting units 20 are driven by one induction coil 30, or one light-emitting unit 20 is driven by a plurality of induction coils 30, so that a sufficient driving voltage is applied to the light-emitting unit 20 to improve brightness of the light-emitting unit 20. In the case that a plurality of light-emitting units 20 is driven by one induction coil 30, the plurality of light-emitting units 20 coupled to the induction coil 30 is distributed in an array form, or in the form of a strip, a curve, a ring, a circle, an oval or a polygon, or in the form of a pattern, a word, a character or any other symbols, so as to provide different display information when the light-emitting units 20 emit light, thereby to enable the user to obtain and identify the information. The induction coil 30 is made of a conductive material, e.g., at least one of Cu, Al, Ag, Mg, Pt, Pd, Au, Ni, Nd, Ir, Cr, Li, Mo or Ti. The conductive material may also include a mixture of a conductive metal and a conductive compound. For example, the induction coil 30 is made of Cu or Mo, or a composite material of Cu and Mg. A specific material of the induction coil 30 may be selected according to the practical need.

Figure 5:
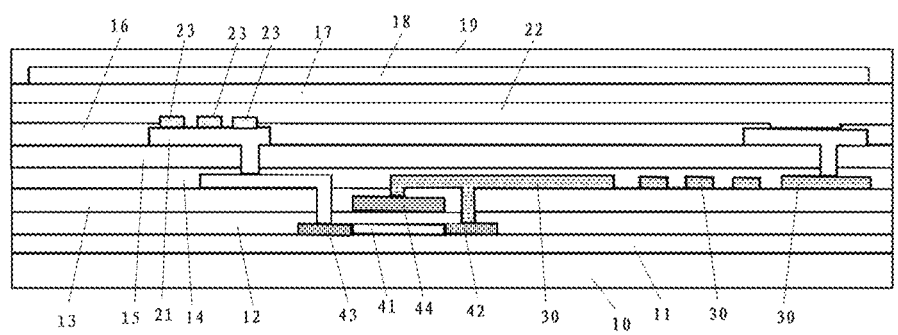
FIG. 5 is a schematic view showing the information collection module according to one embodiment of the present disclosure.

As shown in FIG. 5, the light-emitting unit 20 includes the first electrode 21, a light-emitting layer 23 and the second electrode 22 arranged one on another, and the light-emitting layer 23 is driven to emit light under the effect of the first electrode 21 and the second electrode 22. The first electrode 21 is an anode and the second electrode 22 is a cathode, or the first electrode 21 is a cathode and the second electrode 22 is an anode, depending on the practical need. The cathode is made of Ag, Mg, Cu, Al, Pt, Pd, Au, Ni, Nd, Ir, Cr, Li, Ca, LiF/Ca, LiF/Al, Mo, Ti, or a compound or mixture thereof, such as a mixture of Ag and Mg. In some other embodiments of the present disclosure, the cathode is made of a transparent conductive oxide (TCO), e.g., tungsten oxide ($W_xO_x$), titanium dioxide ($TiO_2$), indium tin oxide (ITO), indium zinc oxide (IZO), zinc oxide (ZnO), indium tin zinc oxide (ITZO), or magnesium oxide (MgO). The anode is of a single layer or a laminated structure, and it is made of Ag, Mg, Al, Pt, Pd, Au, Ni, Nd, Ir, Cr, or a mixture thereof, or a conductive metal oxide such as ITO, IZO or IGZO.

The light-emitting layer 23 includes a first light-emitting layer, a second light-emitting layer and a third light-emitting layer, and light-emitting frequencies of the first light-emitting layer, the second light-emitting layer and the third light-emitting layer may be the same or different. For example, the light-emitting frequencies of the first light-emitting layer, the second light-emitting layer and the third light-emitting layer are different from each other, e.g., the first light-emitting layer emits red light, the second light-emitting layer emits green light, and the third light-emitting layer emits blue light. The light emitted by different light-emitting layers is mixed to obtain light in a desired color, so as to provide various information.

In the information collection module according to the embodiments of the present disclosure, the induction coil 30 and the rectifying circuitry 31 are arranged on the substrate 10, and the induction coil 30 is electrically coupled to the electrodes of the light-emitting unit 20 via the rectifying circuitry 31. The current is rectified by the rectifying circuitry 31, so as to increase a utilization rate of the induction current and reduce a flicker frequency of the light-emitting unit, thereby to improve the display effect. In actual use, the information collection module is arranged on a device or product, and the current is generated by the induction coil through electromagnetic induction. For example, the current is generated by the induction coil through a mobile phone, and then drives the light-emitting unit to emit light, without any complicated power supply. The user obtains information about the device or product in accordance with a light-emitting state of the light-emitting unit, determines a type of the device or product in accordance with identification information, and determines whether or not the device or product is a required one. The identification information is hidden in the display region, so it is able to prevent the identification information from being counterfeited, or contaminated or damaged by an external environment, and thereby it is convenient for the user to obtain the identification information. The information collection module may be applied to a document, a label, a card, a stamp, a package or a bottle, or any other items about which information needs to be obtained.

In some embodiments of the present disclosure, the induction coil 30 is coupled to the electrodes of the light-emitting unit 20 through a control switch, e.g., a diode switch. The induction coil is electrically coupled to, or electrically decoupled from, the electrodes of the light-emitting unit under the control of the control switch, so as to control the light-emitting unit 20. For example, the induction coil 30 is electrically coupled to the electrodes of the light-emitting unit 20 under the control of the control switch, so as to drive the light-emitting unit 20 to emit light in the case that the induction current is generated by the induction coil 30. The induction coil 30 is electrically decoupled from the electrodes of the light-emitting unit 20 under the control of the control switch, so as not to drive the light-emitting unit 20 to emit light in the case that the induction current is generated by the induction coil 30. In other words, the induction coil 30 is electrically coupled to, or electrically decoupled from, the electrodes of the light-emitting unit 20 under the control of the control switch, so as to control whether or not to display information through the light-emitting unit 20. In the case that the quantity of light-emitting units 20 is plural, the induction coil 30 is electrically coupled to, or electrically decoupled from, the electrodes of one or more light-emitting units 20 under the control of the control switch, so as to provide different display information, thereby to enable the user to obtain various identification information.

Figure 6:
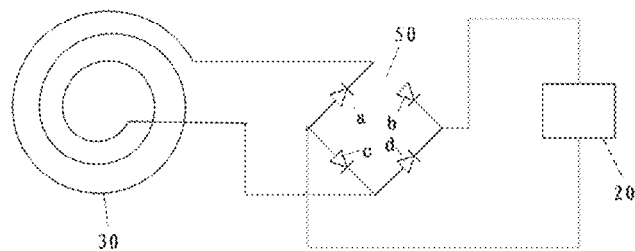
FIG. 6 is a schematic view showing a situation where the induction coil is coupled to the light-emitting unit through a rectifier bridge.
Figure 7A:
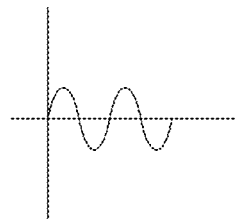
FIG. 7a is a waveform diagram of an input current.
Figure 7B:
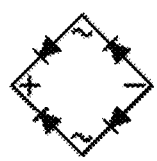
FIG. 7b is a schematic view showing a connection mode of the rectifier bridge.
Figure 7C:
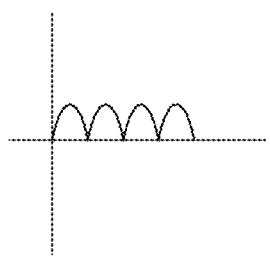
FIG. 7c is a waveform diagram of an output current.
Figure 10:
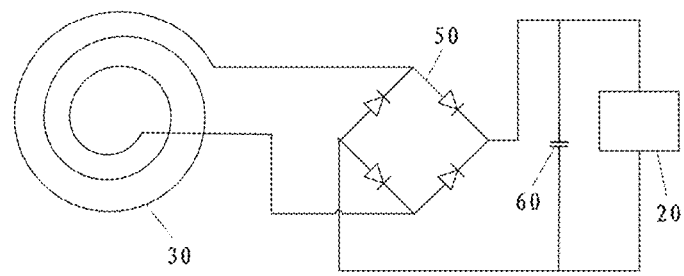
FIG. 10 is a schematic view showing a situation where a voltage stabilizing capacitor is coupled to two ends of an electrode of the light-emitting unit.
Figure 11A:
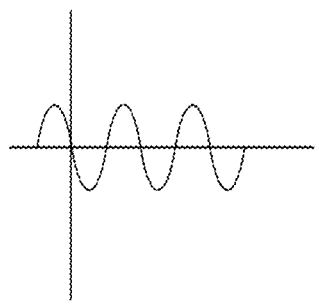
FIG. 11a is a waveform diagram of an input current.
Figure 11B:
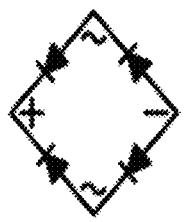
FIG. 11b is a schematic view showing a connection mode of the rectifier bridge.
Figure 11C:
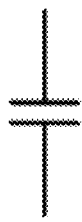
FIG. 11c is a schematic view showing the voltage stabilizing capacitor.

In the embodiments of the present disclosure, as shown in FIG. 6, FIG. 8a, FIG. 8b, FIG. 9, and FIG. 10, the rectifying circuitry includes a rectifier bridge 50 arranged on the substrate 10 and including four TFTs coupled to each other in an end-to-end manner as shown in FIG. 7b and FIG. 11b. As shown in FIG. 6, the rectifier bridge 50 includes a TFT a, a TFT b, a TFT c, and a TFT d coupled to each other in an end-to-end manner. When a current is generated by the induction coil 30 in a clockwise direction, the TFT b and the TFT c are turned on, and the current passes through the TFT b, the light-emitting unit 20 and the TFT c sequentially. When a current is generated by the induction coil 30 in a counterclockwise direction, the TFT d and the TFT a are turned on, and the current passes through the TFT d, the light-emitting unit 20 and the TFT a sequentially. One end of the induction coil 30 is electrically coupled to a first end of the rectifier bridge 50, the other end of the induction coil 30 is electrically coupled to a second end of the rectifier bridge 50, the first electrode 21 of the light-emitting unit 20 is electrically coupled to a third end of the rectifier bridge 50, and the second electrode 22 of the light-emitting unit 20 is electrically coupled to a fourth end of the rectifier bridge 50. FIG. 7a shows a current input curve for this structure, and FIG. 7c shows an output curve. The current is rectified by the rectifier bridge, so it is able to increase the utilization rate of the induction current and reduce the flicker frequency of the light-emitting unit, thereby significantly improve the display effect.

Figure 8A:
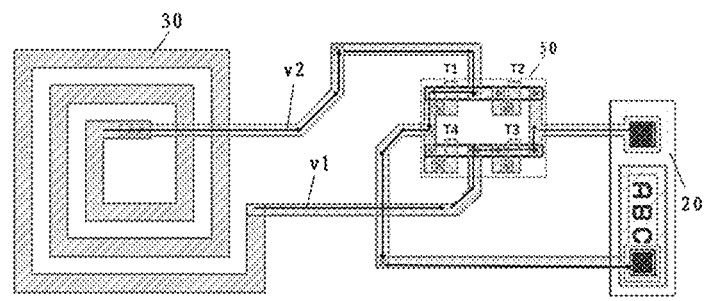
FIG. 8a is a schematic view showing the flow of a signal when the induction coil is in a positive half cycle.
Figure 8B:
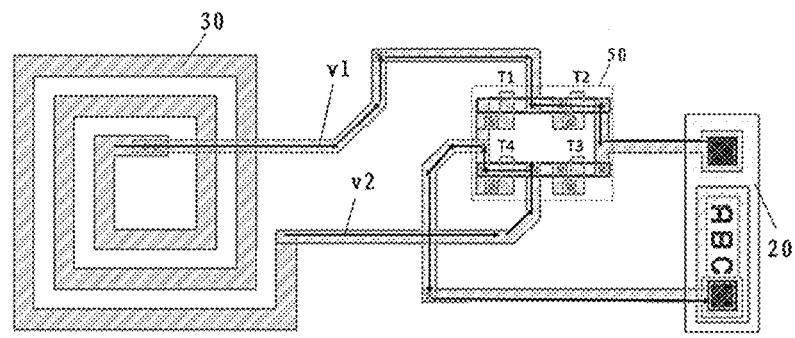
FIG. 8b is a schematic view showing the flow of a signal when the induction coil is in a negative half cycle.
Figure 9:
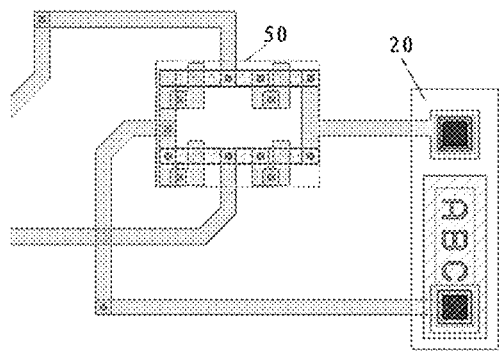
FIG. 9 is a partial schematic view showing a situation where the induction coil is coupled to the light-emitting unit via the rectifier bridge.

As shown in FIG. 8a and FIG. 8b, the rectifier bridge 50 includes a TFT T1, a TFT T2, a TFT T3, and a TFT T4 coupled to each other in an end-to-end manner. As shown in FIG. 8a, in the case that the induction coil 30 is in a positive half cycle, a high-voltage signal V2 is applied through the TFT T1 to the anode of the light-emitting unit 20, and a low-voltage signal V1 is applied through the TFT T3 to the cathode of the light-emitting unit 20, so as to drive the light-emitting unit to emit light. As shown in FIG. 8b, in the case that the induction coil 30 is in a negative half cycle, the high-voltage signal V2 is applied through the TFT T4 to the anode of the light-emitting unit 20, and the low-voltage signal V1 is applied through the TFT T2 to the cathode of the light-emitting unit 20, so as to drive the light-emitting unit to emit light. The current is rectified by the rectifier bridge, so it is able to increase the utilization rate of the induction current and reduce the flicker frequency of the light-emitting unit, thereby to improve the display effect.

In a possible embodiment of the present disclosure, as shown in FIG. 3, the rectifying circuitry includes a rectifier diode 80 arranged on the substrate 10. The induction coil 30 is electrically coupled to the electrodes of the light-emitting unit 20 via the rectifier diode 80, and the current is rectified by the rectifier diode 80. In some other embodiments of the present disclosure, as shown in FIG. 5, the rectifying circuitry includes a thin film transistor 40. The thin film transistor 40 includes an active layer 41, a first electrode 42 and a second electrode 43 coupled to the active layer 41, and a control electrode 44. The thin film transistor is provided with a channel, and a width-to-length ratio of the channel is selected according to the practical need. Each of the first electrode 42 and the second electrode 43 of the thin film transistor may be any one of a source electrode and a drain electrode. The control electrode 44 is electrically coupled to any one of the first electrode 42 and the second electrode 43. One end of the induction coil 30 is electrically coupled to the first electrode 42, and the second electrode 43 is electrically coupled to the first electrode 21 of the light-emitting unit 20. The induction coil 30 is electrically coupled to the control electrode 44, i.e., one end of the induction coil 30 is electrically coupled to the control electrode 44. As shown in FIG. 2, the induction coil 30 is electrically coupled to the electrodes of the light-emitting unit 20 via the thin film transistor 40, and the current is rectified by the thin film transistor 40, so as to increase the utilization rate of the induction current, thereby to improve the display effect. The first electrode 42 and the second electrode 43 are of a single-layered structure made of Mo or Cu, or a double-layered structure made of MoNb/Cu or MTD/Cu, or a three-layered structure made of MoNb/Cu/MTD and MTD/Cu/MTD. However, the materials of the electrodes are not limited thereto. The control electrode 44 is of a single-layered structure made of Mo or Cu single-layer metals, or a double-layered structure made of MoNb/Cu or MTD/Cu, or a three-layered structure made of MoNb/Cu/MTD and MTD/Cu/MTD. However, the materials of the control electrode are not limited thereto.

In the case that the quantity of light-emitting units 20 is plural, a plurality of thin film transistors is provided, and the induction coil 30 is coupled to the electrodes of each light-emitting unit 20 via the thin film transistors. In the plurality of thin film transistors, width-to-length ratios of the channels of the thin film transistors may be the same or different. The width-to-length ratios of the channels of at least two thin film transistors may be different. In the case of a large width-to-length ratio, it is able to reduce a resistance and increase the brightness of the light-emitting unit 20. A specific width-to-length ratio of the channel may be selected according to the practical need.

In the embodiments of the present disclosure, at least one induction coil 30 is coupled to a plurality of thin film transistors, the first electrode 42 of each thin film transistor is electrically coupled to an end of the induction coil 30, and the second electrode 43 of each thin film transistor is electrically coupled to the first electrode 21 or the second electrode 22 of at least one corresponding light-emitting unit 20. Through the thin film transistor between the induction coil 30 and the first electrode 21 or the second electrode 22 of the light-emitting unit 20, it is able to rectify the induction current and increase the utilization rate of the induction current, thereby to improve the display effect.

In some embodiments of the present disclosure, the first electrode 42, the second electrode 43 and the induction coil 30 are arranged on a same layer through a same process, so as to simplify the manufacture thereof. The materials of the first electrode 42 and the second electrode 43 may be the same or different. For example, the first electrode 42 and the second electrode 43 may be made of a same material, so as to simplify the manufacture process. The first electrode 42, the second electrode 43 and the induction coil 30 may be made of a same material, so as to simplify the manufacture process.

In an embodiment of the present disclosure, the quantity of induction coils 30 is plural, at least one induction coil 30 is coupled to a plurality of light-emitting units 20, and the plurality of light-emitting units 20 is coupled to the induction coil 30 at a same position or different positions. For example, the plurality of light-emitting units 20 is coupled to the induction coil 30 at different positions, so as to reduce the interference between adjacent light-emitting units 20, thereby to obtain the information in a better manner.

Figure 1B:
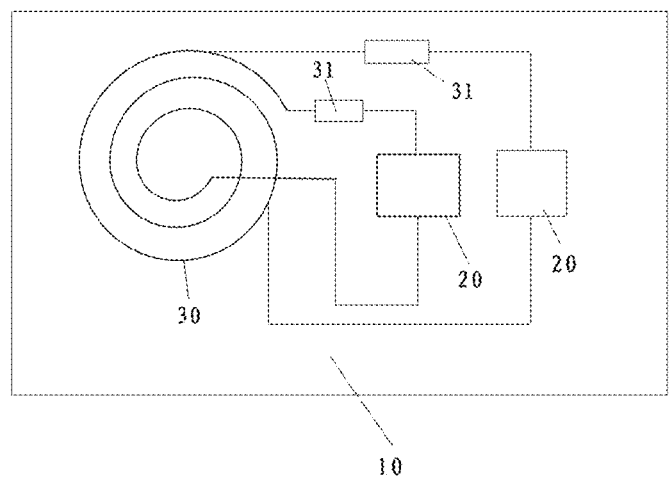
FIG. 1b is another schematic view showing the information collection module according to one embodiment of the present disclosure.

In a possible embodiment of the present disclosure, the quantity of induction coils 30 is plural, at least one induction coil 30 is coupled to a plurality of light-emitting units 20, and light-emitting frequencies of the plurality of light-emitting units 20 are different. As shown in FIG. 1b, for example, two light-emitting units 20 are coupled to one induction coil 30, and the light-emitting frequencies of the two light-emitting units 20 are the same or different. For example, one light-emitting unit 20 coupled to the induction coil 30 emits red light, and the other light-emitting unit 20 coupled to the induction coil 30 emits green light. The light emitted by different light-emitting units 20 is mixed into light in a desired color. For example, three light-emitting units 20 are coupled to one induction coil 30, and the light-emitting frequencies of the three light-emitting units 20 are different. A first light-emitting unit 20 coupled to the induction coil 30 emits red light, a second light-emitting unit 20 coupled to the induction coil 30 emits green light, a third light-emitting unit 20 coupled to the induction coil 30 emits blue light, and the light emitted by different light-emitting units 20 is mixed into light in a desired color.

In some embodiments of the present disclosure, the quantity of induction coils 30 is plural, and light-emitting frequencies of the light-emitting units 20 coupled to at least two induction coils 30 are different. For example, the light-emitting frequencies of the light-emitting units 20 coupled to three induction coils 30 are different. The light-emitting unit 20 coupled to a first induction coil 30 emits red light, the light-emitting unit 20 coupled to a second induction coil 30 emits green light, the light-emitting unit 20 coupled to a third induction coil 30 emits blue light, and the light emitted by different light-emitting units 20 is mixed into light in a desired color.

In the embodiments of the present disclosure, the quantity of induction coils 30 is plural, at least one light-emitting unit 20 is coupled to each induction coil 30, and at least two induction coils 30 are different, e.g., they have different coil parameters. The coil parameter includes at least one of length, shape, material, diameter or the quantity of turns. Through setting at least two induction coils 30 to be different from each other, different currents are generated by the induction coils in a same magnetic field, so that the light-emitting units 20 coupled to the induction coils 30 emit light in different ways, e.g., at different brightness values. In this way, it is able to increase light-emitting states of the light-emitting units 20, thereby to provide different display information through different light-emitting states, and enable the user to obtain various information.

In a possible embodiment of the present disclosures, the quantity of induction coils 30 is plural, and the quantity of light-emitting units coupled to at least two induction coils 30 is different. For example, there are three induction coils 30, where a light-emitting unit is coupled to a first induction coil 30, two light-emitting units are coupled to a second induction coil 30, and three light-emitting units are coupled to a third induction coil 30. Through different quantities of light-emitting units coupled to different induction coils 30, it is able to provide different light-emitting states, thereby to provide different display information and enable the user to obtain various information.

In some embodiments of the present disclosure, at least one induction coil 30 is coupled to a plurality of light-emitting units 20, the electrodes of at least two light-emitting units 20 are coupled to the induction coil at different positions, and the at least two light-emitting units 20 have different brightness values. For example, the electrodes of each light-emitting unit 20 are coupled to the induction coil at different positions, and the plurality of light-emitting units 20 is spaced apart from each other along a lengthwise direction of the induction coil, so as to prevent the interference between the adjacent light-emitting units 20.

Figure 1C:
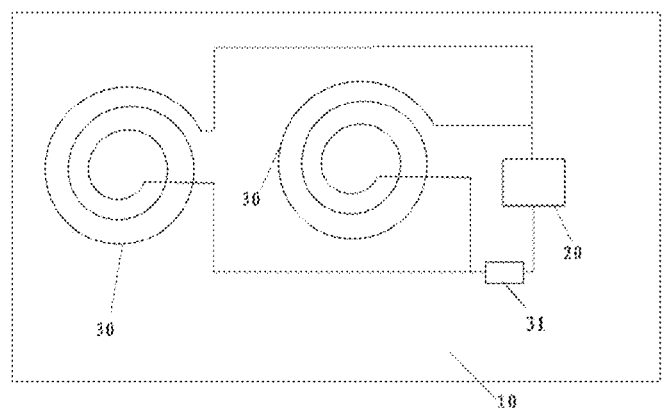
FIG. 1c is yet another schematic view showing the information collection module according to one embodiment of the present disclosure.

In a possible embodiment of the present disclosure, the quantity of induction coils 30 is plural, and the quantity of induction coils coupled to at least two light-emitting units 20 is different. For example, one induction coil is coupled to one light-emitting unit 20, and the light-emitting unit 20 is driven to emit light due to the current generated by the induction coil. As shown in FIG. 1c, two induction coils are coupled to another light-emitting unit 20, the two induction coils are coupled to each other in parallel, and the light-emitting unit 20 is driven to emit light due to the induction current generated by the two induction coils. In the case that the induction coils generate the induction current in a magnetic field, the brightness values of the light-emitting unit are different when the quantity of induction coils coupled to the light-emitting unit 20 is different. Through different light-emitting states of the light-emitting units 20, it is able to provide different display information, thereby to enable the user to obtain various identification information.

In some embodiments of the present disclosure, the quantity of induction coils 30 is plural, and the plurality of induction coils 30 is arranged at a same layer, so as to simplify the manufacture process. The plurality of induction coils 30 may be made of a same material or different materials. To be specific, the induction coils 30 may be made of a same material, so as to simplify the manufacture process.

Figure 11D:
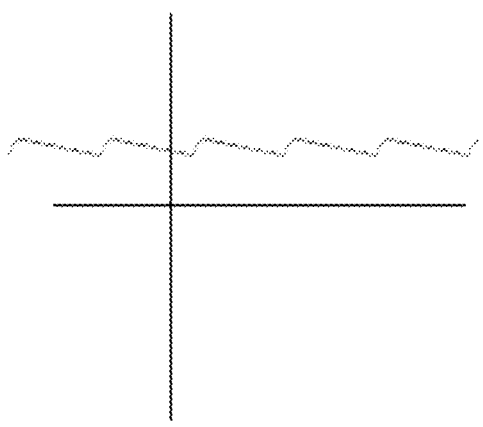
FIG. 11d is a waveform diagram of an output current.

In the embodiments of the present disclosure, as shown in FIG. 10, one end of the induction coil 30 and the first electrode 21 of the light-emitting unit 20 are electrically coupled to one end of a voltage stabilizing capacitor 60, and the other end of the induction coil 30 and the second electrode 22 of the light-emitting unit 20 are electrically coupled to the other end of the voltage stabilizing capacitor 60. The appropriate voltage stabilizing capacitor 60 is added at each of the first electrode and the second electrode of the light-emitting unit to store energy. After being rectified by the rectifier bridge, the induction current is further stabilized by the voltage stabilizing capacitor 60. FIG. 11a shows a current input curve of the structure, and FIG. 11d shows a current output curve. Charges are collected by the voltage stabilizing capacitor 60 and then released stably and slowly, so as to stabilize the light-emitting state of the light-emitting unit 20, thereby to enable the user to obtain the display information in a better manner. Through the rectifying circuitry and the voltage stabilizing capacitor, it is able to provide stable and reliable excitation to the light-emitting unit in a better manner, thereby to improve the display effect.

In some embodiments of the present disclosure, as shown in FIG. 5, a buffer layer 11 is arranged on the substrate 10, and the buffer layer 11 is made of SiNx or SiOx. An active layer 41 and the first electrode 42 and the second electrode 43 coupled to the active layer 41 are arranged on the buffer layer 11. An insulation layer 12 covering the active layer 41, the first electrode 42 and the second electrode 43 is arranged on the buffer layer 11. The control electrode 44 is arranged on the insulation layer 12 at a position corresponding to the active layer 41. A dielectric layer 13 covering the control electrode 44 is arranged on the insulation layer 12, and the induction coil 30 is arranged on the dielectric layer 13. One end of the induction coil 30 is electrically coupled to the first electrode 42, and the other end of the induction coil 30 is electrically coupled to the second electrode 22 of the light-emitting unit 20. The light-emitting unit 20 is driven to emit light under the effect of the induction current generated by the induction coil 30.

A passivation layer 14 covering the induction coil 30 is arranged on the dielectric layer 13, and a planarization layer 15 is arranged on the passivation layer 14. The light-emitting unit 20 includes the first electrode 21, the light-emitting layer 23, and the second electrode 22 laminated one on another. The first electrode 21 is an anode and the second electrode 22 is a cathode. The first electrode 21 is arranged on the planarization layer 15, and the first electrode 21 is an anode. A cover layer 16 covering the first electrode 21 is arranged on the planarization layer 15, and an aperture is formed in the cover layer 16 at a position corresponding to the first electrode 21. The light-emitting layer 23 is arranged on the first electrode 21 at a position corresponding to the aperture. The second electrode 22 is arranged on the cover layer 16. The light-emitting layer 23 is driven to emit light through the first electrode 21 and the second electrode 22. A deposition layer 17 is arranged on the second electrode 22, an ink layer 18 is arranged on the deposition layer 17, and a deposition layer 19 is arranged on the ink layer 18. To be specific, the ink layer 18 is covered by the deposition layer 19.

The present disclosure further provides in some embodiments an information collection apparatus which includes the above-mentioned information collection module.

Through the information collection module, the user obtains information about a device or product in accordance with the light-emitting state of the light-emitting unit, and then determines a type of the device or product in accordance with identification information. The identification information is hidden in the display region, so it is able to prevent the identification information from being counterfeited, or contaminated or damaged by an external environment, thereby to enable the user to obtain the identification information conveniently.

In the embodiments of the present disclosure, the information collection apparatus includes at least one of a document, a label, a card, a stamp, a package, or a bottle. For example, the information collection apparatus is a label arranged on a device or product. For another example, the information collection apparatus is a package. Information about the device or product is obtained through the information collection apparatus in accordance with the light-emitting state of the light-emitting unit, and then the type of the device or product is determined in accordance with the identification information. The identification information is hidden in the display region, so it is able to prevent the identification information from being counterfeited, or contaminated or damaged by an external environment, thereby to enable the user to obtain the identification information conveniently.

The information collection apparatus is a package or bottle made of transparent plastic or glass. The bottle is provided with an identification region, e.g., a transparent region, and the information collection apparatus is integrated in the identification region so as to prevent it from being contaminated or damaged by the external environment. The information about the device or product is obtained through the information collection apparatus in accordance with the light-emitting state of the light-emitting unit. The identification information is hidden in the display region, so it is able to prevent the identification information from being counterfeited, or contaminated or damaged by an external environment, thereby to enable the user to obtain the identification information conveniently.

The above embodiments are for illustrative purposes only, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. An information collection module, comprising:
a substrate comprising a display region, a light-emitting unit being distributed in the display region; and
an induction coil and a rectifying circuitry arranged on the substrate, the induction coil being electrically coupled to electrodes of the light-emitting unit via the rectifying circuitry, wherein
the rectifying circuitry comprises a rectifier bridge, one end of the induction coil is electrically coupled to a first end of the rectifier bridge, the other end of the induction coil is electrically coupled to a second end of the rectifier bridge, a first electrode of the light-emitting unit is electrically coupled to a third end of the rectifier bridge, and a second electrode of the light-emitting unit is electrically coupled to a fourth end of the rectifier bridge, or
the rectifying circuitry comprises a rectifier diode through which the induction coil is electrically coupled to the electrodes of the light-emitting unit.

2. The information collection module according to claim 1, wherein the rectifying circuitry comprises a thin film transistor,
wherein the thin film transistor comprises:
an active layer, and a first electrode and a second electrode coupled to the active layer, one end of the induction coil being electrically coupled to the first electrode, the second electrode being electrically coupled to a first electrode of the light-emitting unit, and the other end of the induction coil being electrically coupled to a second electrode of the light-emitting unit; and
a control electrode electrically coupled to any one of the first electrode and the second electrode.

3. The information collection module according to claim 2, wherein at least one induction coil is coupled to a plurality of thin film transistors, the first electrode of each of the thin film transistors is electrically coupled to an end of the induction coil, and the second electrode of each of the thin film transistors is electrically coupled to the first electrode or the second electrode of at least one corresponding light-emitting unit.

4. The information collection module according to claim 2, wherein the first electrode, the second electrode and the induction coil are arranged on a same layer.

5. The information collection module according to claim 1, wherein the quantity of induction coils is plural, and at least one induction coil is coupled to a plurality of light-emitting units.

6. The information collection module according to claim 1, wherein the quantity of induction coils is plural, and the light-emitting units coupled to at least two induction coils have different light-emitting frequencies.

7. The information collection module according to claim 1, wherein the quantity of induction coils is plural, each of the induction coils is coupled to at least one light-emitting unit, and at least two induction coils are different from each other.

8. The information collection module according to claim 1, wherein the quantity of induction coils is plural, and the quantity of light-emitting units coupled to at least two induction coils is different.

9. The information collection module according to claim 1, wherein at least one induction coil is coupled to a plurality of light-emitting units, and the electrodes of at least two light-emitting units are coupled to the induction coil at different positions.

10. The information collection module according to claim 1, wherein the quantity of induction coils is plural, and the quantity of induction coils coupled to at least two light-emitting units is different.

11. The information collection module according to claim 1, wherein the quantity of induction coils is plural, and the plurality of induction coils is arranged on a same layer.

12. The information collection module according to claim 1, wherein one end of the induction coil and a first electrode of the light-emitting unit are electrically coupled to one end of a voltage stabilizing capacitor, and the other end of the induction coil and a second electrode of the light-emitting unit are electrically coupled to the other end of the voltage stabilizing capacitor.

13. An information collection apparatus, comprising the an information collection module; wherein the information collection module comprises:
- a substrate comprising a display region, a light-emitting unit being distributed in the display region; and
- an induction coil and a rectifying circuitry arranged on the substrate, the induction coil being electrically coupled to electrodes of the light-emitting unit via the rectifying circuitry,
- wherein the rectifying circuitry comprises a rectifier bridge, one end of the induction coil is electrically coupled to a first end of the rectifier bridge, the other end of the induction coil is electrically coupled to a second end of the rectifier bridge, a first electrode of the light-emitting unit is electrically coupled to a third end of the rectifier bridge, and a second electrode of the light-emitting unit is electrically coupled to a fourth end of the rectifier bridge, or
- wherein the rectifying circuitry comprises a rectifier diode through which the induction coil is electrically coupled to the electrodes of the light-emitting unit.

14. The information collection apparatus according to claim 13, wherein the information collection apparatus comprises at least one of document, label, card, stamp, package or bottle.

15. The information collection apparatus according to claim 13, wherein the rectifying circuitry comprises a thin film transistor,
wherein the thin film transistor comprises:
- an active layer, and a first electrode and a second electrode coupled to the active layer, one end of the induction coil being electrically coupled to the first electrode, the second electrode being electrically coupled to a first electrode of the light-emitting unit, and the other end of the induction coil being electrically coupled to a second electrode of the light-emitting unit; and
- a control electrode electrically coupled to any one of the first electrode and the second electrode.

16. The information collection apparatus according to claim 15, wherein at least one induction coil is coupled to a plurality of thin film transistors, the first electrode of each of the thin film transistors is electrically coupled to an end of the induction coil, and the second electrode of each of the thin film transistors is electrically coupled to the first electrode or the second electrode of at least one corresponding light-emitting unit.

17. The information collection apparatus according to claim 15, wherein the first electrode, the second electrode and the induction coil are arranged on a same layer.

18. The information collection apparatus according to claim 13, wherein the quantity of induction coils is plural, and at least one induction coil is coupled to a plurality of light-emitting units.

* * * * *